United States Patent
Cho et al.

(10) Patent No.: US 9,075,229 B2
(45) Date of Patent: Jul. 7, 2015

(54) COVER OF HEAD UP DISPLAY AND HOUSING INCLUDING THE COVER

(71) Applicant: Hyundai Motor Company, Seoul (KR)

(72) Inventors: Jun Young Cho, Seoul (KR); Joong Young Sung, Seoul (KR)

(73) Assignee: Hyundai Motor Company, Seoul (KR)

( * ) Notice: Subject to any disclaimer, the term of this patent is extended or adjusted under 35 U.S.C. 154(b) by 35 days.

(21) Appl. No.: 14/090,856

(22) Filed: Nov. 26, 2013

(65) Prior Publication Data

US 2014/0307324 A1    Oct. 16, 2014

(30) Foreign Application Priority Data

Apr. 16, 2013    (KR) .................. 10-2013-0041483

(51) Int. Cl.
| | |
|---|---|
| *G02B 27/14* | (2006.01) |
| *G09G 5/00* | (2006.01) |
| *G02B 27/01* | (2006.01) |
| *B60K 35/00* | (2006.01) |

(52) U.S. Cl.
CPC ............ *G02B 27/0101* (2013.01); *G02B 27/01* (2013.01); *G02B 27/14* (2013.01); *B60K 35/00* (2013.01); *G09G 5/00* (2013.01); *B60K 2350/2073* (2013.01); *B60K 2350/2086* (2013.01); *G02B 2027/015* (2013.01); *G02B 2027/0118* (2013.01)

(58) Field of Classification Search
CPC .... G02B 27/00; G02B 27/01; G02B 27/0101; G02B 27/017; G02B 27/14; G02B 2027/012; G02B 2027/0118; G02B 2027/015; G02B 2027/0154; B60K 35/00; B60K 37/00; B60K 37/04; B60K 2350/2052; B60K 2350/2073; B60K 2350/2086; C09G 5/00
USPC .................. 359/601, 630, 631, 868, 869, 871; 345/7–9

See application file for complete search history.

(56) References Cited

U.S. PATENT DOCUMENTS

| | | | | |
|---|---|---|---|---|
| 4,973,139 | A | * | 11/1990 | Weinhrauch et al. ........... 349/11 |
| 6,359,737 | B1 | * | 3/2002 | Stringfellow ................. 359/631 |
| 6,542,305 | B2 | | 4/2003 | Nakamura et al. |
| 7,671,822 | B2 | | 3/2010 | Dobschal |
| 2014/0368544 | A1 | * | 12/2014 | Kobayashi, Manabu ..... 345/633 |

FOREIGN PATENT DOCUMENTS

| | | |
|---|---|---|
| JP | 04-057881 U | 5/1992 |
| JP | 2006-011168 | 1/2006 |
| JP | 2011-209617 A | 10/2011 |
| JP | 2012-063524 A | 3/2012 |
| KR | 10-2010-0044526 | 4/2010 |

* cited by examiner

*Primary Examiner* — Loha Ben
(74) *Attorney, Agent, or Firm* — Mintz Levin Cohn Ferris Glovsky and Popeo, P.C.

(57) ABSTRACT

A cover of a head up display and a housing including the head up display cover are provided. The cover of a head up display includes a cover member and a cover panel that is coupled with a lower portion of the cover member and has an elliptical reflecting curved surface that reflects external incident light. The cover and the housing allow the viewing region of a driver to be enlarged while satisfying reflection conditions which reflect external incident light under the elliptical cross-section of a driver's eye.

6 Claims, 5 Drawing Sheets

COVER OF HEAD UP DISPLAY AND HOUSING INCLUDING THE COVER

CROSS-REFERENCE TO RELATED APPLICATION

This application claims priority to and the benefit of Korean Patent Application No. 10-2013-0041483 filed in the Korean Intellectual Property Office on Apr. 16, 2013, the entire contents of which are incorporated herein by reference.

BACKGROUND (a) Field of the Invention

The present invention relates to a cover of a head up display and a housing that includes the cover. More particularly, the present invention relates to a cover of a head up display with an elliptic reflective surface and a housing that includes the cover.

(b) Description of the Related Art

In general, a head up display (HUD) has been developed to provide flight information to an airplane pilot and the HUD is mounted on an aircraft, particularly, a fighter. Recently, the HUD has been applied to a vehicle to conveniently report running information of the vehicle to a driver for the vehicle.

The HUD applied to the vehicle outputs various information such as running information or navigation information of the vehicle necessary to operate the vehicle and is mounted on a front glass window of the vehicle within a range without departing from a main visual field of a driver while the driver runs the vehicle.

The HUD for a vehicle as described above includes a liquid crystal panel installed an inner side of an instrument panel in front of a driver side to display a running information image, a light emitting unit or a backlight unit that illuminates the liquid crystal panel, an optical system that enlarges or reduces the running information image displayed on the liquid crystal panel to a suitable size and adjusts a focus of the image, and a reflecting mirror that reflects the running information image adjusted by the optical system on a front glass window of the vehicle to display the running information image on the front glass window of the vehicle.

The liquid crystal panel, the light emitting unit, the optical system, and the reflecting mirror are embedded and mounted within a housing that has a box shape. An opening that has a predetermined size is formed in the housing to allow image light reflected through the reflecting mirror to be irradiated to the front glass window of the vehicle. A dust cover or a cover is mounted in the opening to prevent a foreign material such as dust from flowing into the housing through the opening.

In the foregoing HUD for a vehicle, to enlarge a viewing region of the driver, the size of the opening must be increased. Due to limitation of a mounting space for the HUD and interference between peripheral components, the sizes of housing and the opening thereof may not be increased to a predetermined size or greater.

The above information disclosed in this section is only for enhancement of understanding of the background of the invention and therefore it may contain information that does not form the prior art that is already known in this country to a person of ordinary skill in the art.

SUMMARY

The present invention provides a cover of a HUD and a housing that includes the same having advantages of enlarging a viewing region of a driver by increasing a size of an opening into which an image light is irradiated in a housing that has a limited mounting space and a limited size satisfies a reflecting condition of an external incident light such as sunlight.

According to an exemplary embodiment of the present invention, a cover of a head up display may include: a cover member; and a cover panel coupled with a lower portion of the cover member and having an elliptical reflecting curved surface that reflects external incident light. A first focus may be formed at one edge of the cover member; and the elliptical reflecting curved surface may be formed based on the first focus.

When a first external incident light passes through the first focus may be firstly reflected to a wind shield by the elliptical reflecting curved surface and may then be secondarily reflected toward the driver by the wind shield, a curvature of the elliptical reflecting curved surface may be set to cause the light to be reflected to a lower location by a predetermined interval than the elliptical shape (e.g., cross section) of an eye of the driver.

The elliptical reflecting curved surface may be formed allowing a second focus to be disposed above the first focus; and the elliptical reflecting curved surface may be formed allowing the second incident light incident to the elliptical reflecting curved surface between the first focus and the second focus to pass through a lower region of the elliptical cross-section of an eye. A curvature of the elliptical reflecting curved surface and the cover member may be formed allowing a third incident light incident to the elliptical reflecting curved surface from an upper region of the second focus to be primarily reflected toward the cover member by the elliptical reflecting curved surface, and may be blocked by the cover member to achieve secondary reflection.

According to another exemplary embodiment of the present invention, a housing of a head up display may include: the cover; and a housing body that has a hollow box shape and in which an opening may be formed, the cover being mounted in the opening. The cover may be disposed in the opening in which an image light source is irradiated to efficiently prevent foreign materials from entering the housing.

Further, since the cover has an elliptical reflecting curved surface, external incident light such as sunlight may be reflected by the cover and may then be condensed at one focus at a lower location than the elliptical cross-section of an eye of the driver, not to prevent a front visual field of the driver. In addition, since the cover has the elliptical reflecting curved surface, the size of the opening in the housing having a limited size may be increased, so that a viewing region of the driver may be optimally enlarged.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings.

Figure 1:
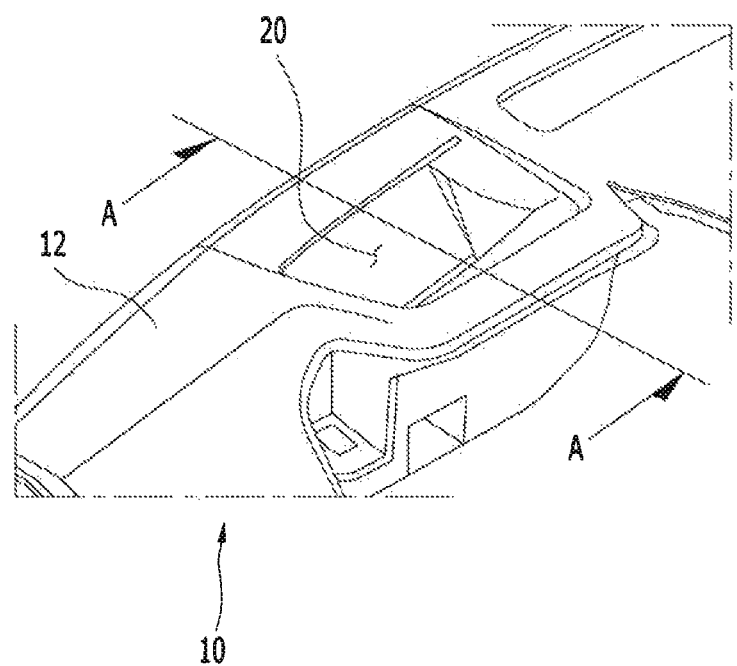
FIG. 1 is an exemplary view illustrating a housing of a HUD according to an exemplary embodiment of the present invention.

Referring to FIG. 1, the housing 10 of a HUD according to an exemplary embodiment of the present invention may include a housing body 12 that has an approximate box shape. The housing 10 may have a hollow box shape. Although not shown in an inside of the housing 10, a liquid crystal panel that displays a running information image (e.g., a vehicle operation image), a light emitting unit or a backlight unit that illuminates the liquid crystal panel, an optical system that increases or reduces the running information image displayed on the liquid crystal panel to a suitable size and adjusts a focus of the image, undo reflecting mirror that reflects the running information image adjusted by the optical system on a front glass window of the vehicle to cause the running information image to be displayed on the front glass window of the vehicle may be embedded within the housing 10.

In addition, an opening may be formed at an upper portion of the housing body 12 and connect an interior of the housing with an exterior of the housing, and a dust cover or a cover 20 may cover the opening to prevent a foreign material such as dust from flowing into the housing 10. The cover 20 may be made of a transparent acryl material allowing image light to be displayed to the exterior of the housing 10 through the reflecting mirror.

Figure 2:
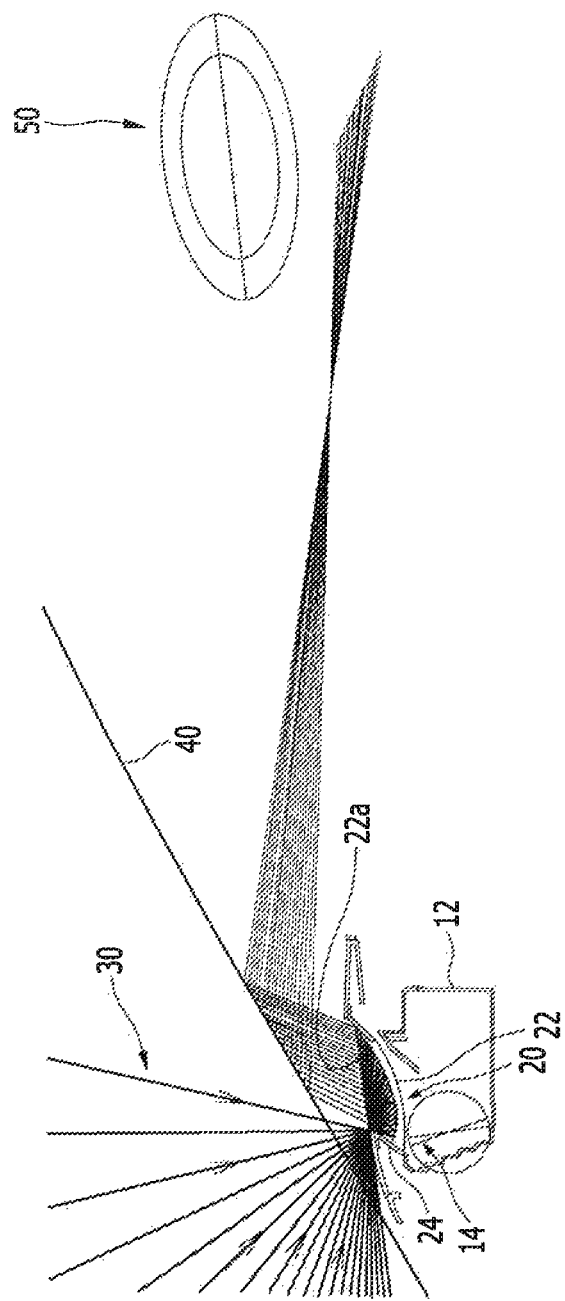
FIG. 2 is an exemplary cross-sectional view taken long line A-A of FIG. 1 according to an exemplary embodiment of the present invention.

Referring to FIG. 2 showing a section of the housing 10, a reflecting mirror 14 that reflects the image light may be embedded inside the housing 10. The cover 20 may include a cover panel 22 that slowly protrudes toward an interior of the housing 10, and a cover member 24 may include a lower portion coupled with the cover panel and may be disposed along an edge of the opening. In addition, an outer side of the cover panel 22 may have an elliptical reflecting curved surface 22a.

When external incident light 30 such as sunlight is incident to the elliptical reflecting curved surface 22a, the light 30 may be primarily reflected toward a wind shield 40 by the elliptical reflecting curved surface 22a, and may then be condensed at one focus at a lower location than the elliptical cross-section 50 of an eye of the driver, to not obstruct a front visual field of the driver. The elliptical reflecting curved surface 22a has an elliptical shape that is non-circular. In particular, a curvature of the elliptical reflecting curved surface 22a may be set to allow the condensed focus to be formed at the lower location of about 20 mm with respect to elliptical cross-section 50 of the driver's eye, thereby satisfying reflecting condition of the cover 20.

Figure 3:
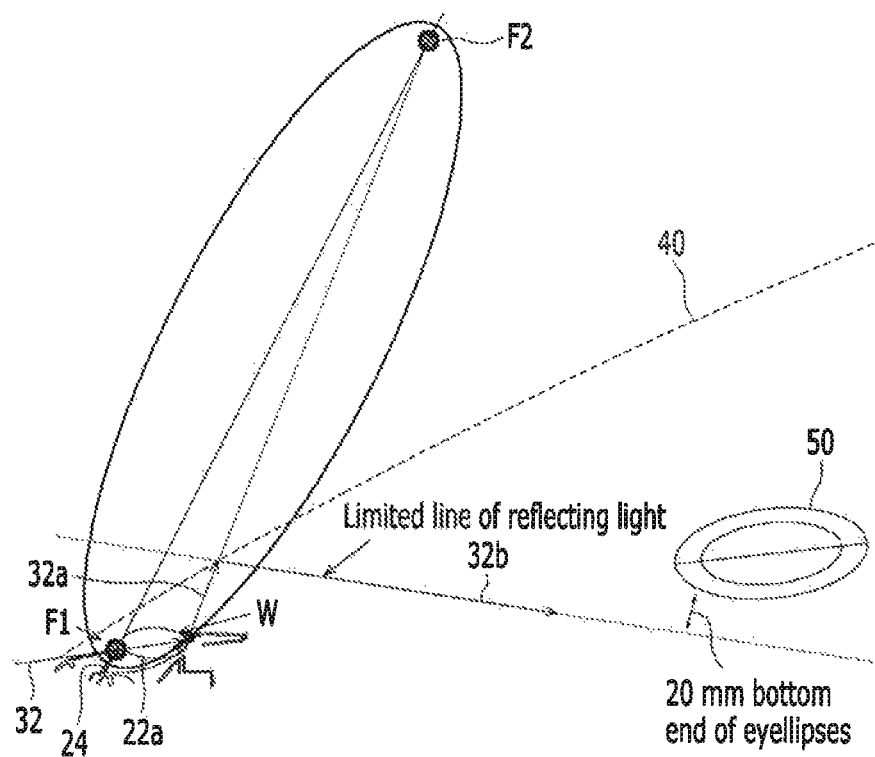
FIG. 3 is an exemplary view illustrating a method of drawing an ellipse of a cover according to an exemplary embodiment of the present invention.

Referring to FIG. 3, the elliptical reflecting curved surface 22a may be a part of an ellipse having a first focus F1 and a second focus F2. The first focus F1 may be disposed at an edge of the cover member 24 above one front end of the elliptical reflecting curved surface 22a.

The first external incident light 32 approximately horizontally incident to the first focus F1 may form the first reflecting light 32a toward the wind shield 40 by the elliptical reflecting curved surface 22a, and the first reflecting light may form the second reflecting light 32b reflected toward the driver by the wind shield 40, a curvature of the elliptical reflecting curved surface 22a may be set to allow the second reflecting light 32b to be disposed at a lower location of minimum about 20 mm than the elliptical cross-section 50 of the driver's eye.

Accordingly, when the elliptical reflecting curved surface 22a is formed, since the housing 10 that has a limited size may increase the size of the opening, for example, a width W of the opening, a size of an image output to the wind shield 40 through the opening to optimally enlarge a viewing region of the driver.

Figure 4:
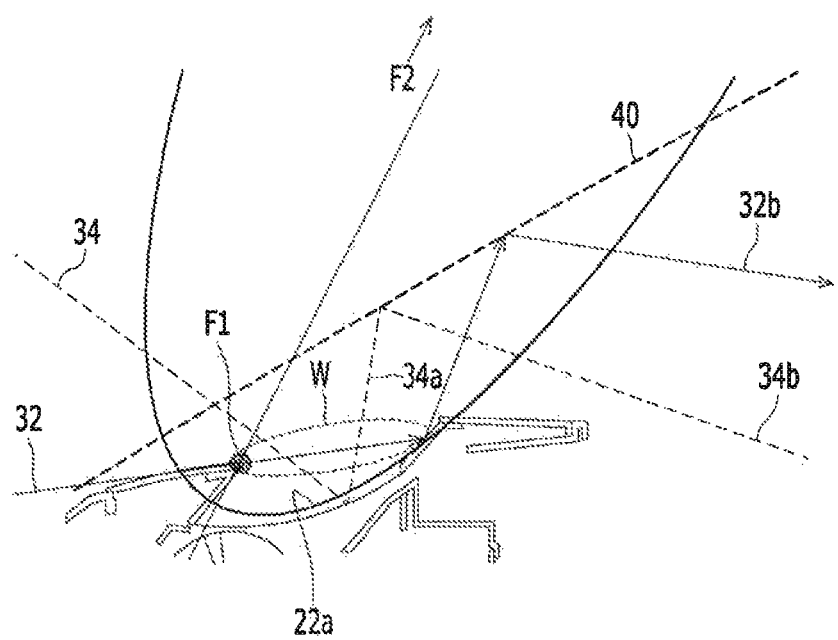
FIGS. 4 and 5 are exemplary views illustrating reflection of external light of a cover of a HUD according to an exemplary embodiment of the present invention.

Referring to FIG. 4, since the second external incident light 34 incident into the elliptical reflecting curved surface 22a of the cover 20 from a space between the first focus F1 and the second focus F2 may form the third reflecting light 34a reflected toward the wind shield 40 by the elliptical reflecting curved surface 22a, the third reflecting light 34a may form the fourth reflecting light 34b again reflected toward the driver by the wind shield 40, the fourth reflecting light 34b may be disposed below the second reflecting light 32b to not obstruct a front visual field of the driver, thereby satisfying reflecting conditions.

Figure 5:
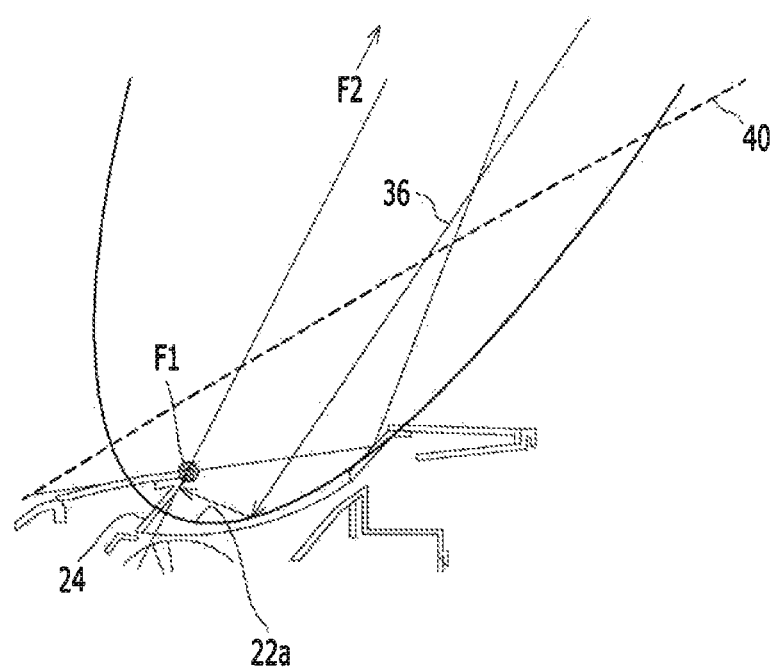

Referring to FIG. 5, the third external incident light 36 introduced into the elliptical reflecting curved surface 22a of the cover 20 in an upper region of the second focus F2 may be blocked by the cover member 24 under the first focus F1 to not form secondary reflection, to allow reflecting conditions to be satisfied.

As mentioned above, an exemplary embodiment of the present invention is disclosed herein, but the present invention is not limited to the disclosed embodiments, but, on the contrary, is intended to cover various modifications and equivalent arrangements included within the appended claims and the detailed description and the accompanying drawing of the present invention.

| Description of symbols | |
|---|---|
| 10: housing | 12: housing body |
| 14: reflecting mirror | 20: cover |
| 22: cover panel | 22a: elliptic reflecting curved surface |
| 24: cover member | 30, 32, 34, 36: incident light |
| 32a, 32b, 34a, 34b, 36a, 36b: reflecting light | |
| 40: wind shield | 50: elliptical cross-section |

What is claimed is:

1. A cover of a head up display comprising:
a cover member; and a cover panel coupled with a lower portion of the cover member and having an elliptical reflecting curved surface that reflects external incident light.

2. The cover of claim 1, wherein a first focus is formed at one edge of the cover member; and the elliptical reflecting curved surface is formed based on the first focus.

3. The cover of claim 2, wherein when a first external incident light passed through the first focus is firstly reflected to a wind shield by the elliptical reflecting curved surface and then is secondarily reflected toward the driver by the wind shield, a curvature of the elliptical reflecting curved surface is set allowing the light to be reflected to a lower location by a predetermined interval than an elliptical cross-section of an eye of the driver.

4. The cover of claim 3, wherein the elliptical reflecting curved surface is formed allowing a second focus to be disposed above the first focus; and the elliptical reflecting curved surface is formed allowing a second incident light incident to the elliptical reflecting curved surface between the first focus and the second focus to pass through a lower region than the elliptical cross-section of the eye of the driver.

5. The cover of claim 3, wherein a curvature of the elliptical reflecting curved surface and the cover member are formed allowing a third incident light incident to the elliptical reflecting curved surface from an upper region of the second focus to be primarily reflected toward the cover member by the elliptical reflecting curved surface, and to be blocked by the cover member to achieve secondary reflection.

6. A housing of a head up display comprising:
a cover having a cover member and a cover panel coupled with a lower portion of the cover member and having an elliptical reflecting curved surface that reflects external incident light; and
a housing body having a hollow box shape and in which an opening is formed,
wherein the cover is mounted in the opening.

* * * * *